United States Patent [19]

Salmon

[11] Patent Number: 4,683,977

[45] Date of Patent: Aug. 4, 1987

[54] ADJUSTABLE PEDAL ASSEMBLY

[75] Inventor: Michael E. Salmon, Flint, Mich.

[73] Assignee: Thomas Murphy, Marco Island, Fla.

[21] Appl. No.: 734,473

[22] Filed: May 15, 1985

[51] Int. Cl.⁴ .............................................. B60K 26/00
[52] U.S. Cl. ...................................... 180/334; 74/512; 74/560
[58] Field of Search ...................... 180/334, 335, 90.6; 74/474, 560, 512, 513; 244/221, 234, 235

[56] References Cited

U.S. PATENT DOCUMENTS

| | | | |
|---|---|---|---|
| 543,855 | 8/1895 | Denison | 74/560 |
| 1,392,159 | 9/1921 | Hicks | 74/512 |
| 2,519,804 | 8/1950 | Weinfurt | 74/560 |
| 2,610,006 | 9/1952 | Boyce | 74/512 |
| 2,620,042 | 12/1952 | Vincent | 74/560 |
| 2,730,214 | 1/1956 | Scott | 74/560 |
| 2,873,616 | 2/1959 | Schilling | 74/512 |
| 3,047,088 | 7/1962 | Murrell | 180/90.6 |
| 3,059,960 | 10/1962 | Komorowski | 74/560 |
| 3,129,605 | 4/1964 | Bonnell | 74/560 |
| 3,151,499 | 10/1964 | Roe | 74/560 |
| 3,377,881 | 4/1968 | Lucas | 74/512 |
| 3,448,634 | 6/1969 | Eggers et al. | 74/560 |
| 3,511,109 | 5/1970 | Tanaka | 74/560 |
| 3,643,525 | 2/1972 | Gibas | 74/512 |
| 4,060,144 | 11/1977 | Teti | 180/317 |
| 4,470,321 | 9/1984 | Girty | 74/474 |
| 4,499,963 | 2/1985 | Liston | 180/334 |
| 4,516,439 | 5/1985 | Sagaser | 74/512 |

FOREIGN PATENT DOCUMENTS

| | | | |
|---|---|---|---|
| 600536 | 6/1960 | Canada | 180/90.6 |
| 176448 | 3/1953 | Fed. Rep. of Germany | 74/560 |
| 2644626 | 4/1977 | Fed. Rep. of Germany | 180/334 |
| 952831 | 3/1964 | United Kingdom | 74/560 |

Primary Examiner—John J. Love
Assistant Examiner—Everett G. Diederiks, Jr.
Attorney, Agent, or Firm—Burton, Parker & Schramm

[57] ABSTRACT

An adjustable pedal assembly for a vehicle having foot pedals which are shiftable longitudinally to vary the distances between the pedals and the driver. The pedal assembly is made up of a frame, one or more rotatable pedals fixed to the frame, and a power transmission device coupled to the frame and to the pedals for providing an output in response to pedal rotation.

11 Claims, 7 Drawing Figures

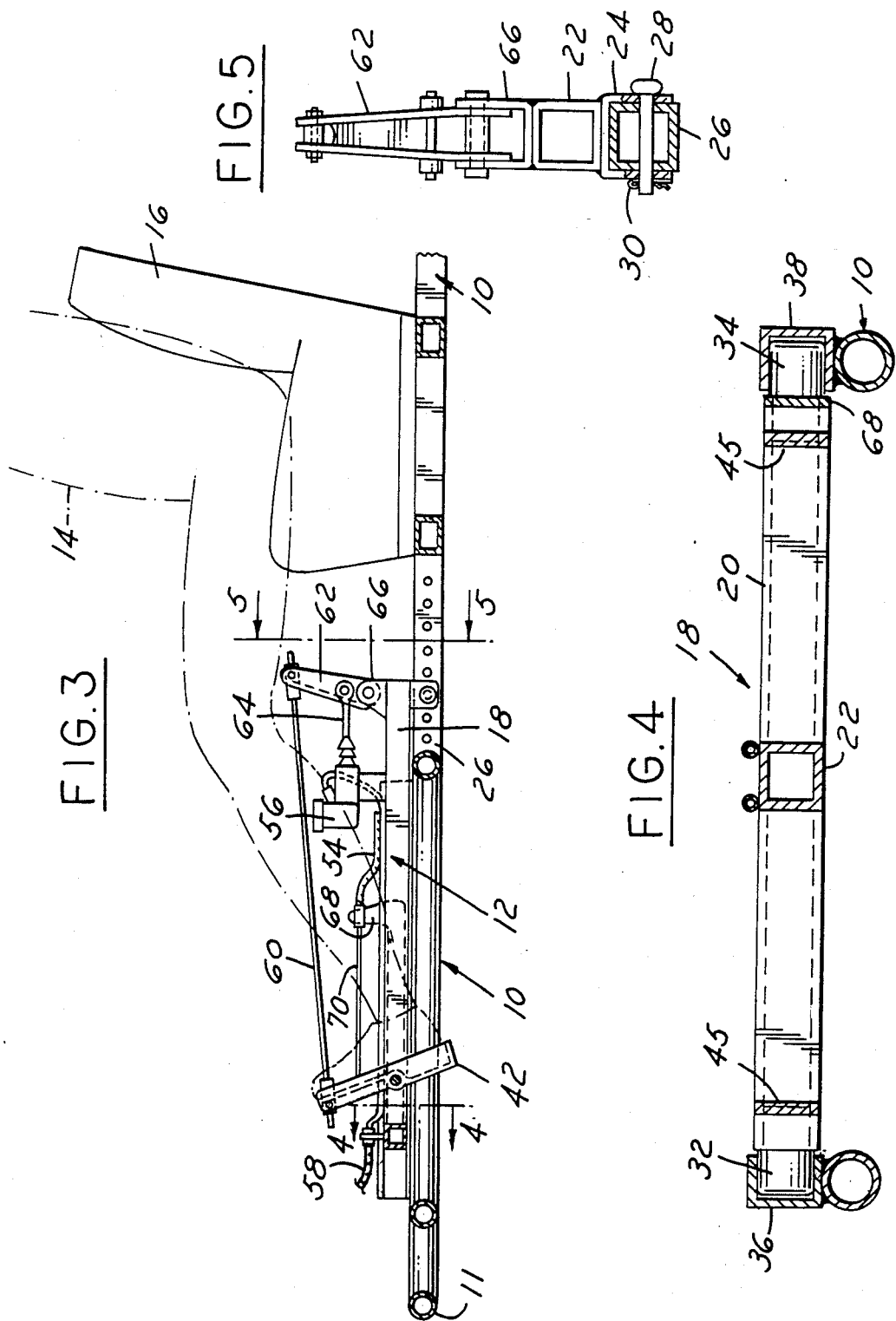

ADJUSTABLE PEDAL ASSEMBLY

DESCRIPTION

1. Field of Invention

The present invention relates to the field of adjustable pedals for vehicles and more particularly to pedals rotatable about a central transverse axis.

2. Background of Invention

In order to have a vehicle be suitable for a wide variety of driver sizes, it is necessary to be able to have relative movement between the seat and the foot pedals typically used for braking and acceleration. While it is most common in modern cars to have an adjustable seat and fixed pedals, there have been numerous, fairly unsuccessful, attempts at incorporating an adjustable pedal assembly in automobiles. Prior adjustable pedal assemblies tend to be very mechanically complex such as devices shown in U.S. Pat. No. 3,151,499, Roe. Adjustable pedals of the type previously described are depressed by the driver to move the throttle or to apply the brakes and are returned by a spring when the driver's foot is removed. In normal vehicle operation, the driver's feet are supported by the floor of the chassis.

Centrally pivotable pedals have been used in various aircraft, motorcycles and utility vehicles where the pedal is rotatably attached to a horizontal member which serves as a foot rest or foot peg. The occupant of the vehicle can, in some instances use the pedal for support during vehicle operation which is controlled by moving the driver's foot, rotating the pedal about a horizontal shaft.

SUMMARY OF THE INVENTION

I provide an adjustable pedal assembly made up of a frame which is shiftable longitudinally relative to the vehicle chassis and may be temporarily locked at various positions. Rotatably attached to the frame are one or more foot pedals rotatable about a transverse axis. Also attached to the frame are means for power transmission cooperating with the foot pedals to provide an output in response to the rotation of the pedal by the driver's foot.

BRIEF DESCRIPTION OF THE DRAWINGS

FIG. 3 is a side sectional view taken along line 3—3 in FIG. 1.

FIG. 4 is an enlarged cross-sectional view taken along line 4—4 in FIG. 3.

FIG. 5 is an enlarged sectional view taken along line 5—5 in FIG. 3.

DESCRIPTION OF THE PREFERRED EMBODIMENT

Figure 1:
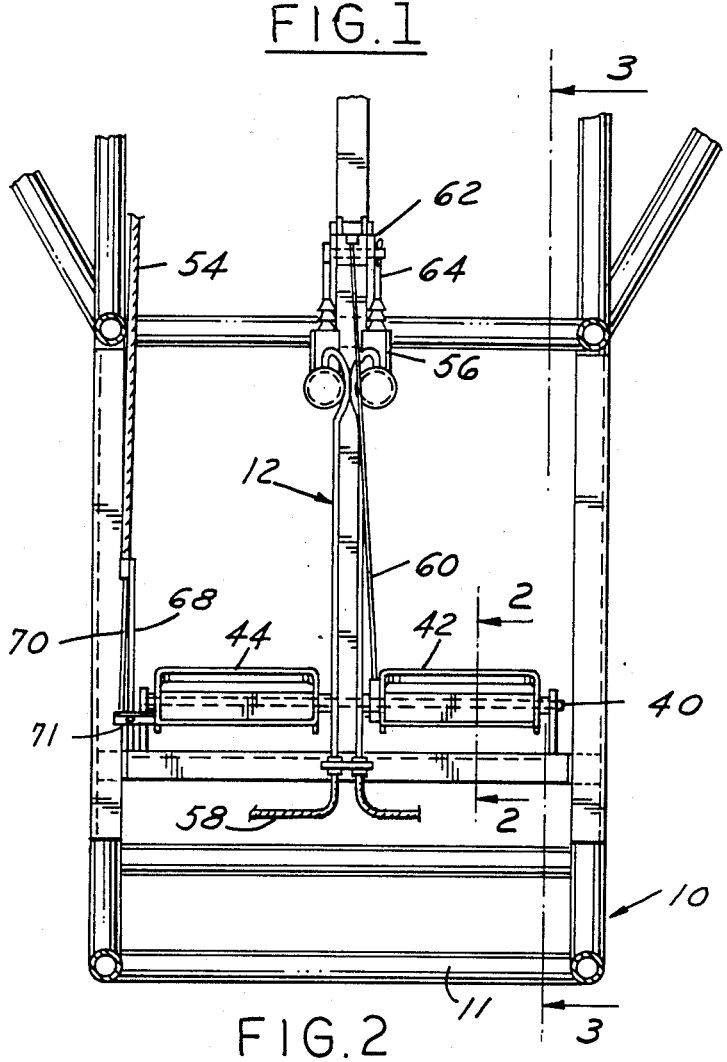
FIG. 1 is a plan view of a portion of a vehicle chassis showing the adjustable pedal assembly.

With reference to the drawings, FIG. 1 shows a plan view of a vehicle having a tubular frame 10, the front of which is indicated at 11, with an adjustable pedal assembly 12 mounted thereon. FIG. 3 shows a cross-section of the vehicle showing the relationship between the pedal assembly 12 and the driver 14 of the vehicle shown in phantom outline. In the vehicle shown, seat 16 is fixed to the chassis, while the pedal assembly 12 is moved longitudinally along the center line of the vehicle fore and aft relative to the seat whereby accomodation is provided for drivers of different leg length.

Figure 6:
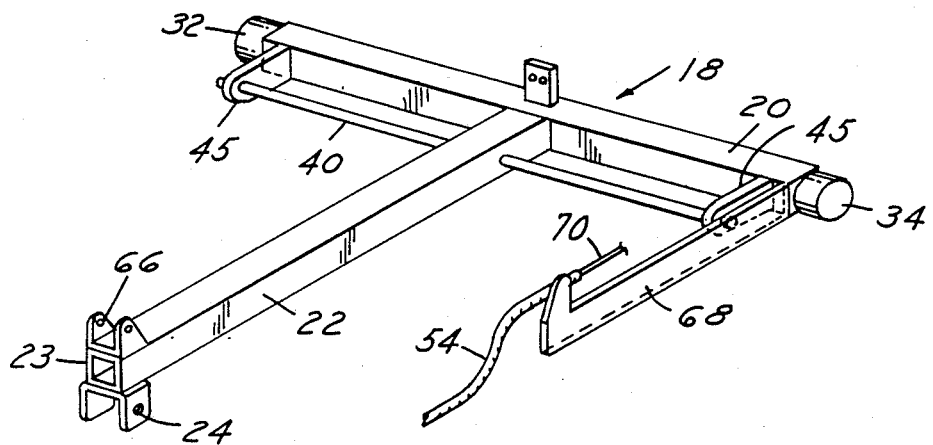
FIG. 6 is a right rear quarter perspective view of the frame portion of the pedal assembly.
Figure 7:
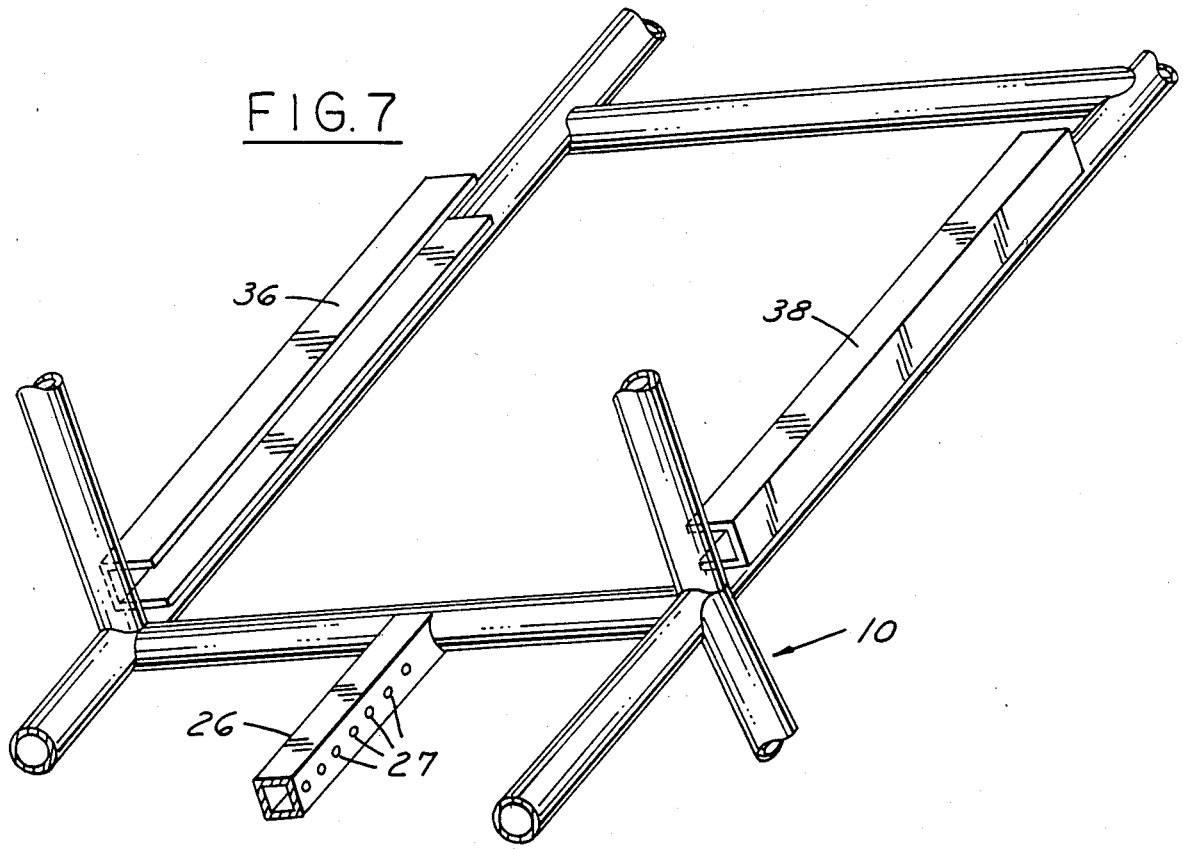
FIG. 7 is a right rear quarter perspective view of the vehicle chassis.

The adjustable pedal assembly is provided with a generally T-shaped frame 18 which is shown in perspective view in FIG. 6. Frame 18 lies in a horizontal plane and is made up of a transverse portion 20 and a longitudinal portion 22. One end of the longitudinal portion is attached to the center of the transverse portion to form a T, the opposite end 23 is adjustable secured to the vehicle chassis at various longitudinal points. U-shaped bracket 24 is fixed to end 23 of the frame for cooperation with the central longitudinal chassis member 26. Bracket 24 and chassis member 26 are provided with a series of matching holes 27 for the installation of pin 28 as shown in FIG. 5. Pin 28 and cotter pin 30, used for retention thereof, provide a simple, strong means for temporarily fastening the frame to the vehicle at various longitudinal locations to accomodate leg length of the driver.

The ends 32 and 34 of the frame transverse portion 20 slidingly cooperate with tracks 36 and 38 which form part of the vehicle chassis. With the transverse portion 20 of the T-shaped framed maintained in tracks 36 and 38 and the U-shaped bracket 24 anchored to chassis member 26, the frame is rigidly attached to the vehicle chassis. Horizontal shaft 40 serves as a means for rotatably attaching pedals 43 and 44 to the frame. Shaft 40 is centrally attached to the pedal assembly frame longitudinal portion 22 and affixed at each end to frame transverse portion 20 by brackets 45. Shaft 40 is generally perpendicular to the longitudinal axis and is parallel to the horizontal frame longitudinal portion 20.

Pedals 42 and 44 are similar in construction. Each is generally rectangular and sized to accommodate a driver's foot and is disposed generally perpendicular to the axis of the driver's leg as shown in FIG. 3. The pedals are pivotable upon shaft 40 along a central transverse axis in the general region of the arch of the driver's foot. The driver rotates the pedal by rotating his ankle, moving his toe and heel fore and aft. With the pedal firmly supported by shaft 40 which is attached to the pedal frame and in turn, to the chassis, the driver can exert force upon the pedal without causing it to rotate using them as structural foot pegs. This feature is particularly advantageous to off-the-road vehicles such as dune buggies or race cars in which the driver experiences a very rough ride or large fore and aft deceleration and acceleration forces.

Figure 2:
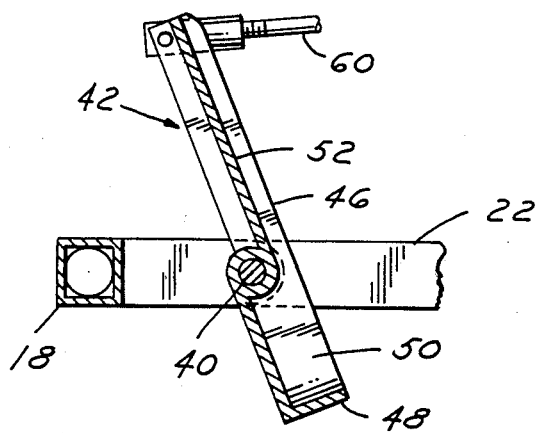
FIG. 2 is a sectional side elevation taken along line 2—2 in FIG. 1.

In order to prevent the driver's foot from sliding off the pedal, the preferred embodiment of the pedal has raised wall portions about the periphery of the pedal as shown in FIG. 2. The side walls 46 and heel wall 48 help retain the driver's foot. The embodiment shown is also provided with a recessed heel region 50 slightly lower than toe region 52. While this recessed heel designed pedal is advantageous for drivers wearing heeled shoes, a flat pedal may be desirable for drivers wearing flat soled tennis shoes and the like.

The adjustable pedal assembly is provided with two pedals. The right pedal 44 serves as an accelerator and is linked to the vehicle's throttle (not shown) by means of a sheathed cable 54. The left pedal 42 is coupled to the vehicle's braking system (not shown) by means of a fluid filled hydraulic cylinder 56, the output of which is connected to flexible brake line 58. Both the sheathed cable 54 and the brake line 58 have sufficient length and flexibility to allow the adjustable pedal assembly to be moved fore and aft longitudinally throughout the entire range of travel. The hydraulic cylinder and the sheathed cable end are fixed to and move with the adjustable pedal assembly, therefore, no adjustments to the hydraulic cylinder linkage or to the cable are necessary when the pedal assembly is moved.

The hydraulic cylinder 56 is coupled to the left pedal 42 by link 60, lever 62 and piston rod 64 as shown in FIG. 3. The front end of link 60 is pivotably attached to the upper end of pedal 42. Link 60 extends pivotably from pedal 42 to the upper end of lever 62. Lever 62 is pivotably attached to lever bracket 66 attached to T-shaped frame 18. Piston rod 64 projects from hydraulic cylinder 56 and is centrally privotably attached to lever 62. The resulting combination of linkages and levers allows the internal piston and the hydraulic cylinder 56 to be displaced by the piston rod in response to the rotation of pedal 42 by the occupant of the vehicle. The length of the lever 62 and the location of the piston rod pivot relative to the lever bracket pivot gives the occupant the necessary mechanical advantage to comfortably operate the brakes. In the embodiment shown there are two hydraulic cylinders used in the braking system, both of which are pivotably attached to lever 62.

Sheathed cable 54 serves as a means for power transmission to allow the driver's right foot to manipulate the vehicle's throttle. The sheath of cable 54 is attached to cable bracket 68 which is a generally L-shaped member attached to frame 18. Cable 70 attaches to cable pedal bracket 71 projecting transversely from the right side of right pedal 44 above horizontal shaft 40 in such a manner that the cable is moved relative to the cable sheath as the pedal is rotated by the vehicle's occupant. By having the cable sheath attached to the adjustable pedal assembly as described, no adjustment in the throttle cable is necessary as the pedal assembly is moved for various sized drivers.

While the embodiment of the invention shown is only provided with two pedals, one for the accelerator and one for the brake, a three pedal arrangement for a vehicle having a clutch could obviously be made in accordance with the invention. Other obvious modifications such as locating the hydraulic cylinder below the chassis or ahead of the pedals for space considerations might be another possible configuration of the invention. It is understood, of course, that while the forms of this invention herein shown and described constitute preferred embodiments in the invention, it is not intended to illustrate all the possible forms of the invention. It is also understood that the words used are words of description rather than limitation and that various changes may be made without departing from the spirit and scope of the invention herein disclosed.

I claim:

1. In a vehicle having a chassis, a driver's seat and foot pedals spaced longitudinally from the seat, an adjustable pedal assembly permitting longitudinal adjustment of the pedals relative to the seat comprising:
a frame lying in a horizontal plane having a transverse member slidingly cooperating with the vehicle chassis and shiftable longitudinally relative thereto and having a longitudinal member attached to the center of the transverse member and extending toward the driver's seat having an end for locking to the chassis;
means for adjustably locking the frame transverse member end to the chassis at various longitudinal positions;
one or more foot pedals supported on the frame for rotation about a transverse axis wherein the transverse pedal axis is horizontal and bisects the pedal into a toe region and a heel region thereby allowing the pedal to act as a structural foot support; and
means for power transmission fixed to the frame and cooperating with one or more foot pedals to provide outputs in response to the rotation of the pedals by the driver.

2. The assembly of claim 1 wherein the pedal is further provided with means for preventing shifting of the driver's foot.

3. The apparatus of claim 2 wherein the means for preventing the shifting of the driver's foot comprise one or more wall portions projecting up from the pedal periphery for cooperation with the foot of the driver to prevent relative movement therebetween.

4. The assembly of claim 1 further comprising two or more pedals so that both feet of the driver can be constantly supported by the pedals during vehicle operation.

5. The assembly of claim 4 wherein a means for power transmission cooperating with a pedal is coupled to an accelerator of the vehicle and a means of a power transmission cooperating with an other pedal as coupled to brakes of the vehicle.

6. The apparatus of claim 1 further comprising a horizontal shaft fixed to the frame coaxial with the transverse axis of the pedal for rotatable attachment thereof.

7. The assembly of claim 6 wherein the shaft is parallel to and fixedly supported by the transverse portion of the frame for rotatable attachment of two or more pedals in side-by-side orientation.

8. The assembly of claim 1 wherein the means of power transmission of pedal further comprise:
a hydraulic fluid cylinder affixed to the frame;
linkage means connecting the hydraulic fluid cylinder to a pedal so that the cylinder varies in displacement as the pedal rotates; and
a flexible tube for transmission of the displaced fluid providing a power output.

9. The assembly of claim 8 having two pedals, the power transmission means for one of which further comprises a flexible sheathed cable, the sheath being affixed to the frame and the cable affixed to a pedal so that movement of the pedal causes the cable to move relative to the sheath for transmission of a variable output to remote part of the vehicle.

10. The assembly of claim 9 wherein the sheathed cable cooperates with the accelerator of the vehicle and the flexible tube cooperates with the brakes of the vehicle.

11. In a vehicle having a chassis, a driver's seat and foot pedals spaced longitudinally from the seat, an adjustable pedal assembly permitting longitudinal adjustment of the pedals relative to the seat comprising:
two spaced apart parallel longitudinal tracks which are affixed to the vehicle chassis;
a frame supported by the vehicle chassis and shiftable relative thereto for temporary attachment at various positions, said frame lying in a horizontal plane and comprising a transverse member for slidingly cooperating with the tracks and shiftable longitudinally relative thereto, and a longitudinal member attached to the transverse member and extending toward the driver's seat having an end for locking to the chassis;

means for adjustably locking the frame longitudinal member end to the chassis at various longitudinal positions;

a pair of foot pedals rotatably attached to the frame transverse member in side by side orientation, said pedals being rotatable about a transverse axis which is generally perpendicular to the vehicle's longitudinal axis and bisects the pedal into upper and lower regions, said pedals acting as structural support for the driver's feet; and a means for a power transmission affixed to the frame and cooperating with each of the pedals to provide independent outputs in response to the rotation of each of the pedals by the driver.

* * * * *

UNITED STATES PATENT AND TRADEMARK OFFICE
CERTIFICATE OF CORRECTION

PATENT NO. : 4,683,977
DATED : August 4, 1987
INVENTOR(S) : Michael E. Salmon

It is certified that error appears in the above-identified patent and that said Letters Patent is hereby corrected as shown below:

In claim 8, column 4, line 2, please insert after the phrase "power transmission of" the word ---a---.

Signed and Sealed this

Nineteenth Day of January, 1988

Attest:

DONALD J. QUIGG

*Attesting Officer*     *Commissioner of Patents and Trademarks*